US011637638B2

(12) United States Patent
Harley et al.

(10) Patent No.: US 11,637,638 B2
(45) Date of Patent: Apr. 25, 2023

(54) MODULAR CARRIER RECOVERY

(71) Applicants: James St. Leger Harley, Richmond (CA); Tung Trong Nguyen, Kanata (CA); Timothy Creasy, Manotick (CA); Blake Toplis, Ottawa (CA)

(72) Inventors: James St. Leger Harley, Richmond (CA); Tung Trong Nguyen, Kanata (CA); Timothy Creasy, Manotick (CA); Blake Toplis, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 17/543,915

(22) Filed: Dec. 7, 2021

(65) Prior Publication Data
US 2022/0294538 A1     Sep. 15, 2022

Related U.S. Application Data

(60) Provisional application No. 63/160,097, filed on Mar. 12, 2021.

(51) Int. Cl.
*H04B 10/61*     (2013.01)
*H04L 27/26*     (2006.01)

(52) U.S. Cl.
CPC ..... *H04B 10/6165* (2013.01); *H04L 27/2657* (2013.01); *H04L 27/2675* (2013.01)

(58) Field of Classification Search
CPC ............ H04B 10/6165; H04L 27/2657; H04L 27/2675

(Continued)

(56) References Cited

U.S. PATENT DOCUMENTS 9,112,615 B1 * 8/2015 Thesling ............ H04B 10/6165
10,938,483 B1 * 3/2021 Babaee .............. H04B 10/6971
(Continued)

FOREIGN PATENT DOCUMENTS

WO   WO-2014060031 A1 *  4/2014  ........... H04B 10/614

OTHER PUBLICATIONS

Pajovic et al; Multi-Pilot Aided Carrier Phase Estimation for Single Carrier Coherent Systems; 2015; Optical Society of America; pp. 1-3. (Year: 2015).*

(Continued)

*Primary Examiner* — Amritbir K Sandhu
(74) *Attorney, Agent, or Firm* — Integral Intellectual Property Inc.; Amy Scouten; Miriam Paton

(57) ABSTRACT

A method at a receiver comprises receiving a signal conveying symbols at respective positions within a clock cycle, the symbols comprising a data set consisting of data symbols and a pilot set consisting of pilot symbols; determining detected phases of the symbols based on the signal; generating first phase estimates based on the detected phases of a subset of the pilot set, and reference phases of the subset of the pilot set, the first phase estimates being associated with the positions of the pilot set; and generating second phase estimates based on the detected phases of the pilot set, reference phases of the pilot set, and the first phase estimates, the second phase estimates being associated with the positions of the pilot set and of at least a subset of the data set; and applying rotations to the detected phases of the symbols based on the second phase estimates.

20 Claims, 9 Drawing Sheets

(58) Field of Classification Search
USPC .......................................................... 398/208
See application file for complete search history.

(56) References Cited

U.S. PATENT DOCUMENTS

| | | | |
|---|---|---|---|
| 11,309,959 B2* | 4/2022 | Le ...................... | H04B 10/6971 |
| 2016/0277121 A1* | 9/2016 | Millar .................. | H04L 1/0036 |
| 2018/0026726 A1* | 1/2018 | Castrillon .......... | H04B 10/6165 |
| | | | 398/208 |
| 2019/0222321 A1* | 7/2019 | Millar ................ | H04B 10/6165 |
| 2022/0294538 A1* | 9/2022 | Harley ............... | H04B 10/6165 |

OTHER PUBLICATIONS

Cheng et al; Low overhead slipless carrier phase estimation scheme; Aug. 2014; Optical society of America; pp. 1-8. (Year: 2014).*

Yan Li et a; Post-FEC Performance of Pilot-Aided Carrier Phase Estimation over Cycle Slip; Jul. 2019; MDPI Applied Sciences; pp. 1-9. (Year: 2019).*

Magarini et al., "Pilot-Symbols-Aided Carrier-Phase Recovery for 100-G PM-QPSK Digital Coherent Receivers," IEEE Photonics Technology Letters, vol. 24, No. 9, pp. 739-741, May 2012.

Spalvieri and Barletta, "Pilot-AidedCarrier Recovery in the Presence of Phase Noise," IEEE Transactions onCommunications, vol. 59, No. 7, pp. 1966-1974, Jul. 2011.

* cited by examiner

MODULAR CARRIER RECOVERY

CROSS-REFERENCE

This application claims the benefit of U.S. Patent Application Ser. No. 63/160,097 filed Mar. 12, 2021, the entire contents of which are incorporated herein by reference.

TECHNICAL FIELD

This document relates to the technical field of communications.

BACKGROUND

In a communication network, a transmitter may transmit a signal over a communication channel to a receiver, where the signal is representative of digital information in the form of symbols or bits. The receiver may process the signal received over the communication channel to recover estimates of the symbols or bits. Various components of the communication network may contribute to signal degradation, such that the signal received at the receiver comprises a degraded version of the signal that was generated at the transmitter. In the case of an optical communication network, degradation or distortion may be caused by chromatic dispersion (CD), polarization mode dispersion (PMD), polarization dependent loss (PDL), and amplified spontaneous emission (ASE).

In general, the carrier frequency generated at a transmitter oscillator differs from the carrier frequency generated at a receiver oscillator. The difference between the two carrier frequencies may be referred to as carrier frequency offset (CFO). The ability to accurately estimate the CFO at the receiver is important for decoding digital information from coherent optical signals.

SUMMARY

According to a broad aspect, a method at a receiver apparatus comprises receiving a communication signal conveying a plurality of symbols at a respective plurality of positions within a current clock cycle, wherein the plurality of symbols comprises a data set consisting of data symbols and a pilot set consisting of pilot symbols. The method comprises determining detected phases of the plurality of symbols based on the communication signal. The method comprises generating first phase estimates based on the detected phases of a subset of the pilot set, and reference phases of the subset of the pilot set, wherein the first phase estimates are associated with the positions of the pilot set. The method comprises generating second phase estimates based on the detected phases of the pilot set, reference phases of the pilot set, and the first phase estimates, wherein the second phase estimates are associated with the positions of the pilot set and the positions of at least a subset of the data set. The method comprises applying rotations to the detected phases of the plurality of symbols based on the second phase estimates.

According to some examples, the method further comprises determining detected amplitudes of the subset of the data set based on the communication signal, and generating third phase estimates based on the detected phases of the pilot set, the detected phases and the detected amplitudes of the subset of the data set, the second phase estimates, and the reference phases of the pilot set, wherein the third phase estimates are associated with the plurality of positions.

According to some examples, the method further comprises generating first phase error estimates within a phase lock loop based on differences between the detected phases of the subset of the pilot set, and the reference phases of the subset of the pilot set, generating linear phase estimates by applying a loop filter of the phase lock loop to the first phase error estimates, and generating the first phase estimates by interpolating between the linear phase estimates in the current clock cycle and the linear phase estimates in a previous clock cycle.

According to some examples, the method further comprises generating second phase error estimates based on differences between the detected phases of the pilot set and a sum of the first phase estimates and the reference phases of the pilot set, generating linear phase estimates from a sum of the first phase estimates and a signal generated by applying a finite impulse response (FIR) filter to the second phase error estimates, and generating the second phase estimates by interpolating between adjacent linear phase estimates.

According to some examples, the FIR filter applied to the second phase error estimates is anti-causal.

According to some examples, the method further comprises generating third phase error estimates comprising third phase error estimates for the pilot set and third phase error estimates for the subset of the data set, wherein the third phase error estimates for the pilot set are generated based on differences between the detected phases of the pilot set, and a sum of the second phase estimates and the reference phases of the pilot set, and wherein the third phase error estimates for the subset of the data set are generated by applying a two-dimensional phase detector to the detected phases of the subset of the data set, rotated by the second phase estimates, and to the detected amplitudes of the subset of the data set, generating linear phase estimates from a sum of the second phase estimates and a signal generated by applying a FIR filter to the third phase error estimates, and generating the third phase estimates by interpolating between adjacent linear phase estimates.

According to some examples, the FIR filter applied to the third phase error estimates is anti-causal.

According to some examples, the method further comprises buffering the detected phases of the plurality of symbols prior to applying the rotations.

According to some examples, the method further comprises buffering the pilot set and the subset of the data set for a time period based on a processing time incurred by the receiver apparatus in generating the second phase estimates.

According to some examples, the second phase estimates are associated with the plurality of positions.

DETAILED DESCRIPTION

Figure 1:
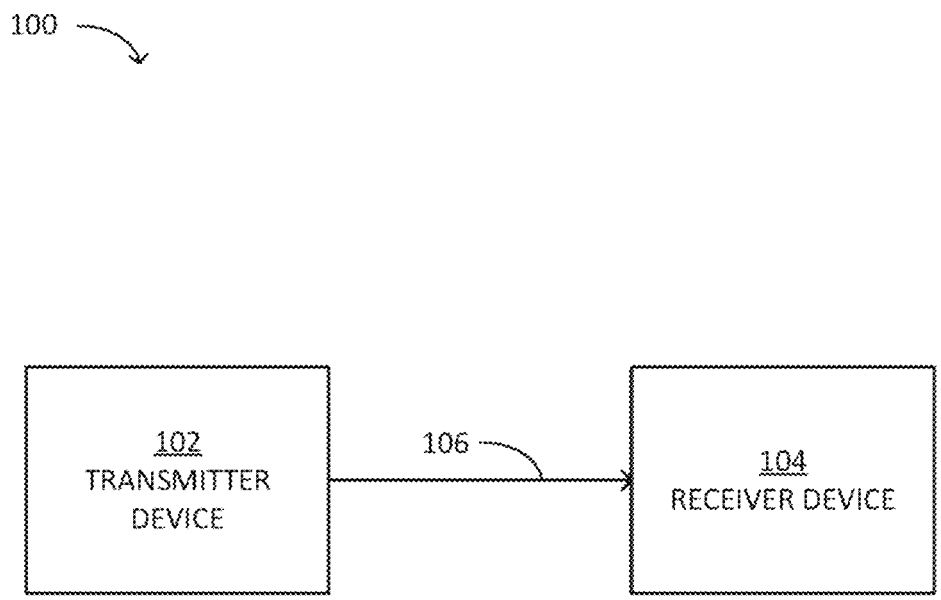
FIG. 1 illustrates an example communication network in accordance with some examples of the technology disclosed herein.

FIG. 1 illustrates an example communication network 100, in accordance with some examples of the technology disclosed herein.

The communication network 100 may comprise at least one transmitter device 102 and at least one receiver device 104, where the transmitter device 102 is capable of transmitting signals over a communication channel, such as a communication channel 106, and where the receiver device 104 is capable of receiving signals over a communication channel, such as the communication channel 106. According to some examples, the transmitter device 102 is also capable of receiving signals. According to some examples, the receiver device 104 is also capable of transmitting signals. Thus, one or both of the transmitter device 102 and the receiver device 104 may be capable of acting as a transceiver. According to one example, the transceiver may comprise a modem.

The communication network 100 may comprise additional elements not illustrated in FIG. 1. For example, the communication network 100 may comprise one or more additional transmitter devices, one or more additional receiver devices, and one or more other devices or elements involved in the communication of signals in the communication network 100.

According to some examples, the signals that are transmitted and received in the communication network 100 may comprise any combination of electrical signals, optical signals, and wireless signals. For example, the transmitter device 102 may comprise a first optical transceiver, the receiver device 104 may comprise a second optical transceiver, and the communication channel 106 may comprise an optical communication channel. According to one example, one or both of the first optical transceiver and the second optical transceiver may comprise a coherent modem.

Each optical communication channel in the communication network 100 may include one or more links, where each link may comprise one or more spans, and each span may comprise a length of optical fiber and one or more optical amplifiers.

Where the communication network 100 involves the transmission of optical signals, the communication network 100 may comprise additional optical elements not illustrated in FIG. 1, such as wavelength selective switches, optical multiplexers, optical de-multiplexers, optical filters, and the like.

Various elements and effects in the communication network 100 may result in the degradation of signals transmitted between different devices. Thus, a signal received at the receiver device 104 may comprise a degraded version of a signal transmitted by the transmitter device 102, where the degradation is caused by various impairments in the communication channel 106. For example, where the communication channel 106 is an optical communication channel, the signal transmitted by the transmitter device 102 may be degraded by polarization mode dispersion (PMD), polarization dependent loss or gain (PDL or PDG), state of polarization (SOP) rotation, amplified spontaneous emission (ASE) noise, and wavelength-dependent dispersion or chromatic dispersion (CD), nonlinear noise from propagation through fiber, and other effects. The degree of signal degradation may be characterized by a signal-to-noise ratio (SNR), or alternatively by a noise-to-signal ratio (NSR). The signals transmitted in the communication network 100 may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

The receiver device 104 may receive a communication signal transmitted over the communication channel 106 from the transmitter device 102, where the communication signal conveys symbols that are representative of digital information. At the receiver device 104, the decoded symbols that are recovered may comprise noisy versions of the symbols that were originally transmitted by the transmitter device 102.

Figure 2:
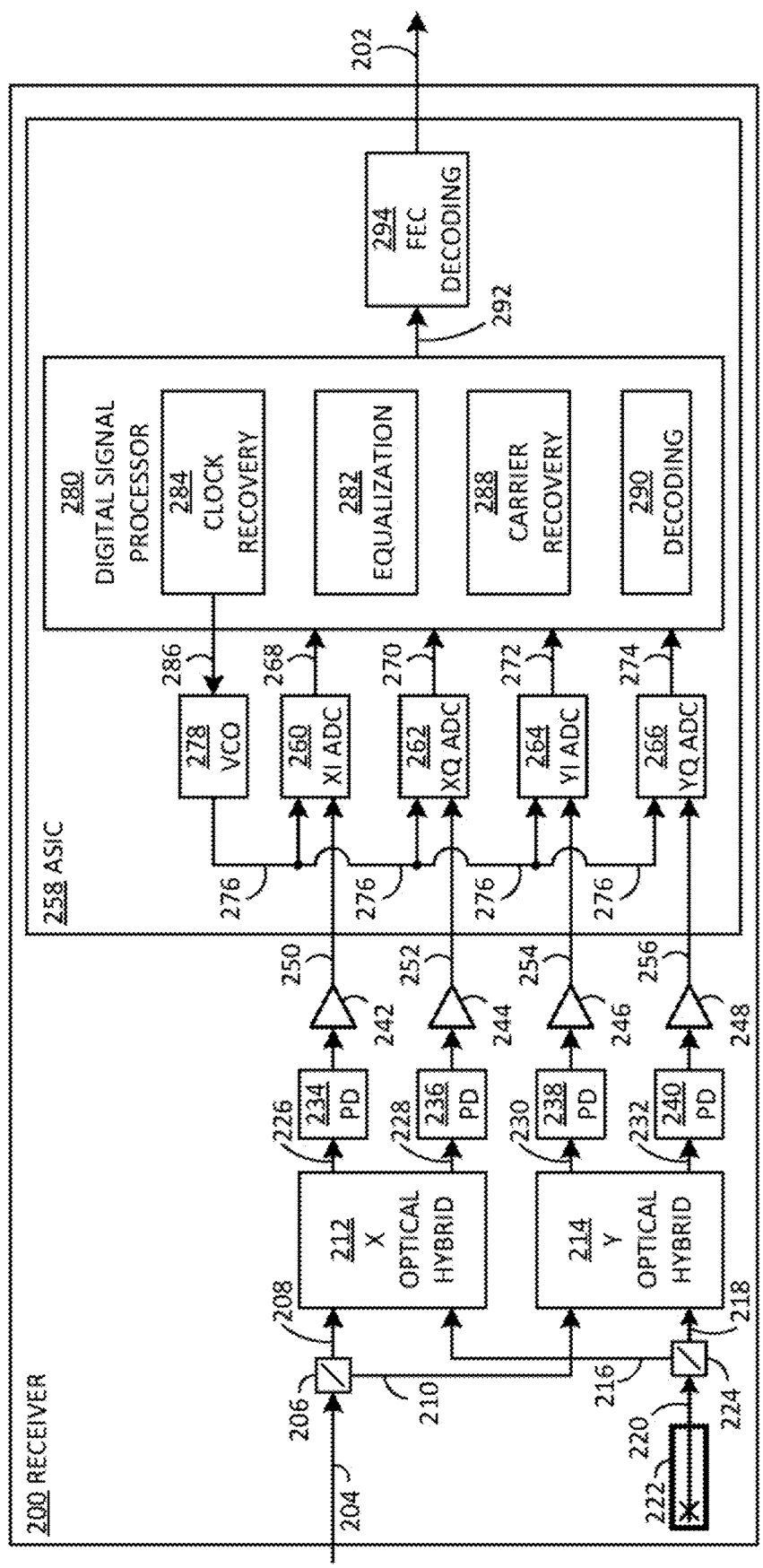
FIG. 2 illustrates an example receiver device in accordance some examples of the technology disclosed herein.

FIG. 2 illustrates an example receiver device 200, in accordance with some examples of the technology disclosed herein. The receiver device 200 is an example of the receiver device 104. The receiver device 200 may comprise additional components that are not described in this document.

The receiver device 200 is configured to receive an optical signal 204, which may comprise a degraded version of an optical signal generated by a transmitter device, such as the transmitter device 102. The optical signal generated by the transmitter device may be representative of information bits (also referred to as client bits) which are to be communicated to the receiver device 200. The optical signal generated by the transmitter device may be representative of a stream of symbols.

According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques such as polarization-division multiplexing (PDM), single polarization modulation, modulation of an unpolarized carrier, mode-division multiplexing, spatial-division multiplexing, Stokes-space modulation, polarization balanced modulation, and the like.

The receiver device 200 is configured to recover corrected client bits 202 from the received optical signal 204. The receiver device 200 may comprise a polarizing beam splitter 206 configured to split the received optical signal 204 into polarized components 208, 210, for example, orthogonally polarized components corresponding to an X polarization and a Y polarization, respectively. The receiver device 200 comprises optical hybrid 212, 214 is configured to process the components 208, 210 with respect to polarized components 216, 218 of a local optical signal 220 produced by a laser 222, where the local optical signal 220 is split into the polarized components 216, 218, for example, by a polarizing beam splitter 224. Where the optical hybrid 212 operates on the X polarization it may generate optical signals 226, 228 corresponding to dimensions XI, XQ, respectively, which denote the in-phase (I) and quadrature (Q) components of the X polarization. Where the optical hybrid 214 operates on the Y polarization it may generate optical signals 230, 232 corresponding to dimensions YI, YQ, respectively, which denote the I and Q components of the Y polarization. The optical signals 226, 228, 230, 232 may be converted by respective photodetectors 234, 236, 238, 240 into analog signals. Together, elements such as the beam splitters 206, 224, the laser 222, the optical hybrids 212, 214, and the photodetectors 234, 236, 238, 240 may form a communication interface configured to receive optical signals from other devices in a communication network, such as the network 100. The analog signals output by the photodetectors 234, 236, 238, 240 may be amplified by respective radiofrequency (RF) pre-amplifiers 242, 244, 246, 248, thereby resulting in respective amplified analog signals 250, 252, 254, 256.

The receiver device 200 may comprise an application specific integrated circuit (ASIC) 258. The ASIC 258 may comprise analog-to-digital converters (ADCs) 260, 262, 264, 266 which are configured to sample the analog signals 250, 252, 254, 256, and to generate respective digital signals 268, 270, 272, 274 corresponding to the dimensions XI, XQ, YI, YQ, respectively. Although illustrated as comprised in the ASIC 258, in an alternate implementation the ADCs 260, 262, 264, 266 or portions thereof may be separate from the ASIC 258. The ADCs 260, 262, 264, 266 may sample the analog signals 250, 252, 254, 256 periodically at a sample rate that is based on a signal 276 received from a voltage-controlled oscillator (VCO) 278.

The ASIC 258 may further comprise a digital signal processor (DSP) 280 configured to apply digital signal processing to the digital signals 268, 270, 272, 274. The DSP 280 may implement equalization processing 282 to compensate for a variety of channel impairments, such as CD, SOP rotation, PMD including group delay (GD) and differential group delay (DGD), PDL or PDG, and other effects. According to some examples, the equalization processing 282 may comprise the application of one or more equalizer filters, where each equalizer filter is characterized by compensation coefficients which may be incrementally updated from time to time, with the goal of generating an output signal has less degradation than the respective input signal. According to some examples, the equalization processing 282 may comprise a static equalization operation which at least partially compensates for slowly changing channel impairments, such as CD. The static equalization operation may comprise the application of a filter that is characterized by compensation coefficients that may be calculated through firmware using the estimated CD during start-up of the receiver device (also referred to the acquisition stage). The compensation coefficients may be applied to received signals (either by convolution in the time domain, or by multiplication in the frequency domain), thereby resulting in processed signals which are, at least partially, compensated for CD. The term "static" is used to reflect the relatively infrequent updating of the compensation coefficients. The slow rate of change of the compensation coefficients means that the static equalization operation is only capable of tracking and compensating for relatively slow changes in the channel response, for example, rates on the order of <1 Hz. According to some examples, the equalization processing 282 may further comprise one or more dynamic equalization operations which at least partially compensate for faster changing channel impairments (for example, rates on the order of 100 kHz or more), such as SOP, PMD, PDL, small amounts of CD, and analog characteristics of the transmitter and receiver. Each dynamic equalization operation may comprise the application of a filter that is characterized by compensation coefficients that may be updated relatively frequently, as compared to the static equalization operation. Examples of the dynamic equalization operation include a Least Mean Squares (LMS) feedback loop, and a feedforward loop as described, for example, by Babaee et al. in U.S. Pat. No. 10,938,483, herein incorporated by reference in its entirety.

The digital signal processing implemented by the DSP 280 further comprises clock recovery 284, which may be implemented by sending a feedback signal 286 to the VCO 278 based on phase offset measurements generated during the clock recovery 284. The feedback signal 286 may result in slight adjustments of the frequency of the VCO 278, which in turn will cause the signal 276 to make slight adjustments in the sample timing at the ADCs 260, 262, 264, 266. This feedback technique for clock recovery is commonly known as a phase lock loop (PLL). According to other examples, the clock recovery 284 may be implemented by using phase offset measurements to generate a phase shift in the signal 276 output by the VCO 278. This mechanism for clock recovery may be implemented using clock phase shifter hardware (not shown) that is known in the art. According to other examples, the clock recovery 284 may be implemented by using phase offset measurements to generate a phase shift in a downstream version of the digital signals 268, 270, 272, 274. This mechanism for clock recovery may be implemented using data phase shifter hardware (not shown) that is known in the art, either in the time domain or in the frequency domain.

The digital signal processing implemented by the DSP 282 may further comprise carrier recovery 288, which compensates for frequency and phase differences between the signal generated at the transmitter and the signal detected at the receiver), symbol-to-bit demapping (or decoding) 290 using a decision circuit, such that signal 292 output by the DSP 280 is representative of the bit estimates. Where the received optical signal 204 is representative of symbols comprising FEC-encoded bits generated as a result of applying FEC encoding to client bits, the signal 292 may further undergo FEC decoding 294 to recover the corrected client bits 202.

The next generation of low-power pluggable devices for optical communications at 60 Gbaud or higher have small form factors and low electrical power limits. According to some examples, these pluggable devices may be used for line side optics or dense wavelength division multiplexing (DWDM) and also for client side optics. One example is Quad Small Form Factor Pluggable Double Density (QSFP-DD) devices. Given the constraints on device size and electrical power, it may be a challenge for these devices to meet performance requirements of certain applications. For example, the power available for the ASIC 258 to implement the carrier recovery 288 may be limited.

Some methods for carrier recovery may rely on the decoding 290 performed by the decision circuit. Traditional symbol decision methods performed on unknown data symbols or payload symbols (herein referred to as data symbols) may be prone to cycle slips, given that the phase detection is limited to a phase range of $-\pi/4$ to $+\pi/4$ (or 90°). However, because the data symbols generally comprise over 95% of the total symbols conveyed by the communication signal, these methods may achieve relatively high accuracy due to averaging over a large number of phase estimates.

Other methods for carrier recovery may rely on the insertion of known synchronization symbols or pilot symbols among the data symbols conveyed by the communication signal. This is described, for example, by Magarini et al.

in "Pilot-Symbols-Aided Carrier-Phase Recovery for 100-G PM-QPSK Digital Coherent Receivers," *IEEE Photonics Technology Letters*, vol. 24, no. 9, pp. 739-741, May 2012, and by Spalvieri and Barletta in "Pilot-Aided Carrier Recovery in the Presence of Phase Noise," *IEEE Transactions on Communications*, vol. 59, no. 7, pp 1966-1974, July 2011. In contrast to carrier recovery methods that rely on data symbols, those that rely on pilot symbols are not prone to cycle slips because the phase detection has a full phase range of $-\pi$ to $+\pi$ (or 360°). However, because pilot symbols typically comprise less than 5% of the total symbols conveyed by the communication signal, these methods may be limited in accuracy, particular when the line SNR is low, since there are fewer phase estimates available for averaging.

It is of interest to design a carrier recovery system which is compatible with the power limitations of certain pluggable devices and which also exhibits good performance, with no cycle slips, in the presence of large laser phase noise. It is also of interest to design a carrier recovery system that is adaptive, dependent on the line SNR.

A modular carrier recovery system is proposed herein which may combine the advantages of phase detection using pilot symbols with the advantages of phase detection using data symbols.

The proposed carrier recovery system comprises three cascading modules: (1) a first module which uses a phase lock loop (PLL) process to generate first phase estimates based on detected phases of pilot symbols; (2) a second module which uses a feed forward (FF) process to generate second phase estimates based on the first phase estimates and the detected phases of the pilot symbols; and (3) an optional third module which uses another FF process to generate third phase estimates based on the second phase estimates and detected phases of data symbols and pilot symbols. As will be described in more detail herein, the modular carrier recovery system may provide accurate phase estimates that are free of cycle slips over a wide range of line SNR values. Furthermore, the modular carrier recovery system (and the power it uses) may be adapted, for example, based on the line SNR.

According to some examples, the pilot symbols may be selected from the same constellation as the data symbols. The modulation format used to convey the data symbols and the pilot symbols may comprise a quadrature amplitude modulation (QAM) format or a quadrature phase shift keying (QPSK) format. In some examples, the pilot symbols may be selected such that their root mean square (RMS) energy is similar to the RMS energy of the data symbols. For example, in the case of a 16-level QAM (16QAM) format, where each constellation point is defined by dimensions XI and XQ, and where each dimension has four possible amplitudes (or projections), namely $(-3, -1, +1, +3)$, the average energy of the data symbols in one dimension is 5. Accordingly, by designing each pilot symbol to have one projection selected from $(-1, +1)$ and the other projection selected from $(-3, +3)$, the pilot symbols may have the same average energy as the data symbols. Using pilot symbols with RMS energy that is close to the RMS energy of the data symbols may be advantageous for reducing non-linear propagation of impairments of the fiber, where excessive peaking of the energy of the pilot symbols may trigger Kerr impairments which are sensitive to instantaneous power of the optical signal. This property may be extended to probabilistic constellation shaping (PCS), wherein there is an increased probability of selecting constellation points having lower amplitudes. For example, in the case of 16QAM with PCS, the average energy of the data symbols in one dimension is reduced from 5 to a lower energy value. Correspondingly, the pilot symbols may be selected to have an average energy closer to this lower energy value.

According to some examples, the pilot symbols may be distributed evenly throughout the data symbols, once every M baud. According to one example, $M \geq 32$. As M increases, the overhead from the pilot symbols is reduced, thereby lowering the overhead-related performance loss. For design simplicity, each ASIC clock cycle may comprise the same number of pilot symbols, which are distributed such that they occupy the same positions in each clock cycle. According to one example, where the ASIC clock update occurs at 128 baud, and each symbol processed in a single clock cycle is denoted by an index n, where n=0 . . . 127, the transmitter may be configured to transmit a signal that comprises four pilot symbols at the four respective positions n=0, n=32, n=64, and n=96.

According to some examples, the sequence of pilot symbols used at the respective pilot positions may be identical. According to other examples, a known sequence of different pilot symbols may be placed at the respective pilot symbol positions, where the sequence is repeated over time. Using a sequence of pilot symbols may reduce coherent non-linear noise from occurring during fiber propagation. The repetition rate of the sequence of pilot symbols may be greater than, equal to, or lower than the clock update rate.

Figure 3:
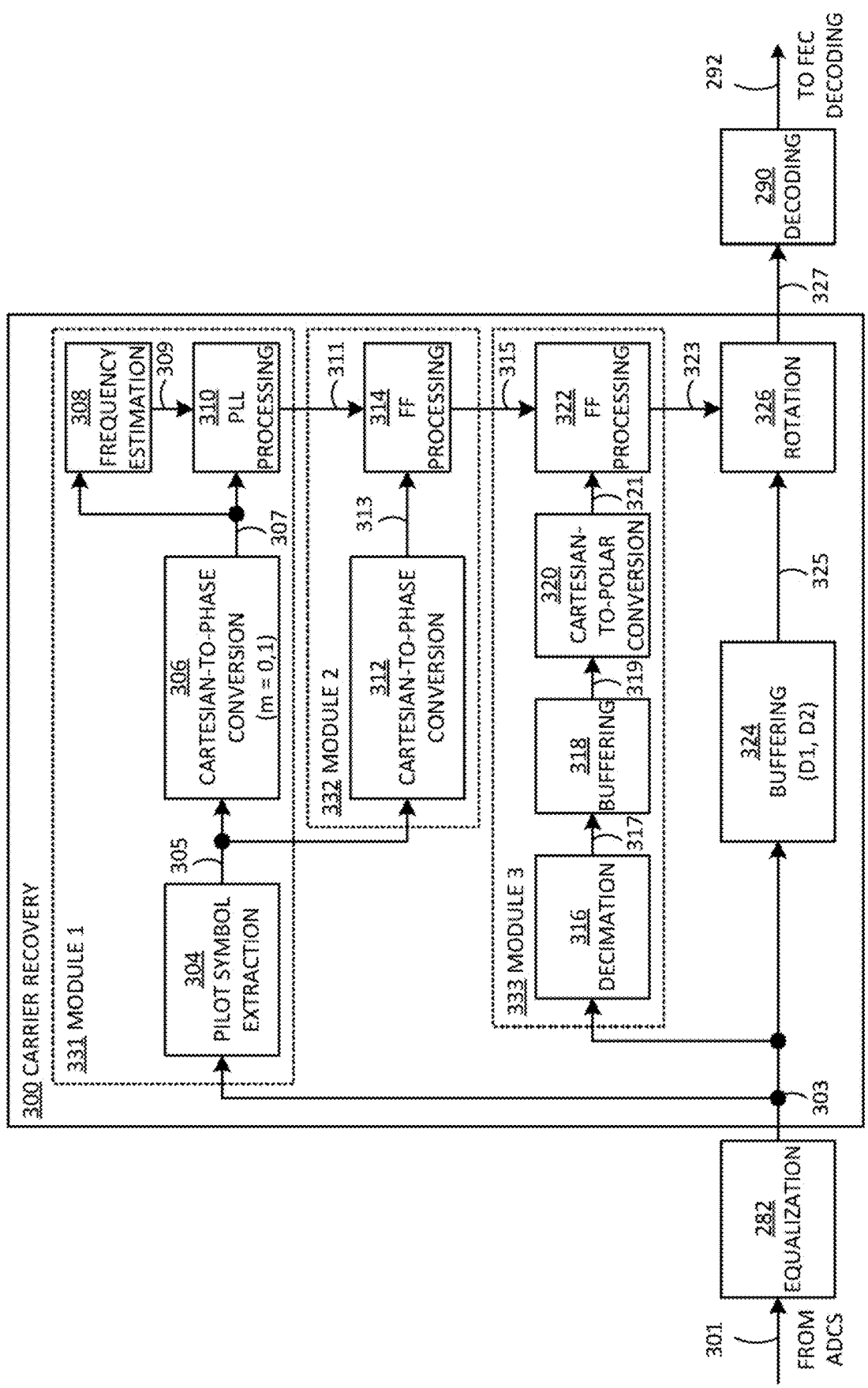
FIG. 3 illustrates a schematic showing a system for modular carrier recovery in accordance with some examples of the technology disclosed herein.

FIG. 3 illustrates a schematic of example carrier recovery processing 300. The carrier recovery processing 300 is an example of the carrier recovery processing 288 implemented by the DSP 280.

A signal 301 represents a combination of the digital signals 268, 270, 272, 274 output by the ADCs 260, 262, 264, 266, which correspond to dimensions XI, XQ, YI, YQ, respectively. The signal 301 may have already undergone clock recovery processing, such as the clock recovery processing 284 described with respect to FIG. 2. The signal 301 may be representative of data symbols and pilot symbols, where the pilot symbols may be distributed in a predetermined pattern amongst the data symbols, as described previously. The equalization processing 282 may be applied to the signal 301, thereby resulting in a signal 303.

In a first module 331 of the carrier recovery process 300, a pilot symbol extraction operation 304 may be applied to the signal 303, thereby generating a signal 305 which is representative of the pilot symbols in the Cartesian domain (i.e., dimensions XI, XQ, YI, YQ). According to some examples, a conversion operation 306 may be applied to the signal 305 to convert a subset of the pilot symbols from the Cartesian domain to the phase domain, thereby resulting in a signal 307 which represents the detected phases or angles of the subset of pilot symbols. The Cartesian-to-phase conversion operation 306 may be implemented using a coordinate rotation digital computer (CORDIC). PLL processing 310 may then be applied to the signal 307. As will be described in more detail with respect to FIG. 4, the PLL processing 310 is configured to generate a signal 311 using a PLL, where the signal 311 represents first phase estimates associated with the positions of the pilot symbols, where the first phase estimates are generated based on the detected phases of the subset of the pilot symbols represented by the signal 307. In order for the loop filter of the PLL to function properly, a digital frequency state variable of the loop filter may be initialized based on an initial frequency estimate 309 generated by a frequency estimation operation 308.

The first phase estimates represented by the signal 311 may provide a relatively coarse initial estimate of phase noise with relatively precise estimate of carrier frequency offset (CFO). As a result of the PLL, the CFO estimate may be significantly more accurate than the initial frequency estimate generated by the frequency estimation process 308. Advantageously, because the first module 331 uses known pilot symbols for phase references, it is capable of detecting phases from −π to +π without the risk of cycle slips.

In a second module 332 of the carrier recovery process 300, a conversion operation 312 may be applied to the signal 305 to convert all of the pilot symbols from the Cartesian domain to the phase domain, thereby resulting in a signal 313 which represents the detected phases of all the pilot symbols. FF processing 314 may then be applied to the signal 313. As will be described in more detail with respect to FIG. 6, the FF processing 314 is configured to generate a signal 315 using a finite impulse response (FIR) filter, where the signal 315 represents second phase estimates associated with the positions of all of the pilot symbols and the positions of at least a subset of the data symbols. In order to prevent the CFO from corrupting the FIR filter, the CFO estimate generated in the first module 331 may be rotated out by subtracting the signal 311 from the signal 313 prior to the filtering. The second phase estimates represented by the signal 315 are expected to be more accurate than the first phase estimates represented by the signal 311. This is a consequence of the phase information gleaned from the additional pilot symbols processed in the second module 332, as well as the properties of the FIR filter, which has a greater bandwidth than the loop filter, and which may optionally be configured to operate in an anti-causal manner. Because the second module 332 uses the first phase estimates, which are immune from cycle slips, the second phase estimates represented by the signal 315 are also expected to be immune from cycle slips.

As will be described in more detail with respect to FIGS. 4 and 6, the processing performed within the first module 331 and the second module 332 may require very little power as a consequence of operating only on known pilot symbols. However, the relative infrequency of the pilot symbols may limit the SNR of the phase estimates.

According to some examples, the carrier recovery process 300 may optionally include a third module 333 which is configured to enhance the accuracy of the carrier recovery by using data symbols in addition to the pilot symbols. In the third module 333, a decimation operation 316 may be applied to the signal 303 (which represents all of the pilot symbols and all of the data symbols), thereby resulting in a signal 317, which comprises a decimated version of the signal 303. The decimation operation 316 eliminates a subset of the symbols represented by the signal 303 based on a decimation factor N, where N is a positive integer such as 2, 4, or 8. The amount of power required to implement the processing performed in the third module 333 may depend on the selected decimation factor N. A greater value of N may reduce the number of symbols to be processed, thereby reducing the processing power. However, this reduction in power may come at the cost of less accuracy in the phase estimates, due to less averaging. The decimation factor N may be selected such that the decimation operation 316 eliminates a subset of the data symbols, while keeping all of the pilot symbols. A buffering operation 318 may be applied to the signal 317, thereby resulting in a signal 319, which represents a delayed version of the signal 317, where the buffering accounts for the processing time required to generate the signal 315 representing the second phase estimates. A conversion operation 320 may be applied to the signal 319 to convert the symbols from the Cartesian domain to the polar domain, thereby resulting in a signal 321 which represents the detected phases and amplitudes of the decimated, delayed symbols. For example, where the signal 319 represents the Cartesian coordinates (I amplitude, Q amplitude) in the X and Y polarizations, the signal 321 may represent the polar coordinates (radius, phase) in the X and Y polarizations. FF processing 322 may then be applied to the signal 321. As will be described in more detail with respect to FIG. 7, the FF processing 322 is configured to generate a signal 323 using a FIR filter, where the signal 323 represents third phase estimates associated with the positions of all of the pilot symbols and all of the data symbols. Again, in order to prevent the CFO from corrupting the FIR filter, the CFO estimate may be rotated out by subtracting the signal 315 from the signal 321 prior to the filtering. The third phase estimates represented by the signal 323 are expected to be more accurate than the second phase estimates represented by the signal 315. This is a consequence of the phase information gleaned from the data symbols processed in the third module 333, as well as the properties of the FIR filter which may optionally be configured to operate in an anti-causal manner. Because the third module 333 uses the second phase estimates, which are immune from cycle slips, the third phase estimates represented by the signal 323 are also expected to be immune from cycle slips.

Because the third module 333 involves processing data symbols, it may require a greater amount of power than the first module 331 and the second module 332. It is contemplated that the carrier recovery process 300 may be adaptable, for example, based on power limitations and/or the line SNR. For example, in the event that limited power is available, the third module 333 may be bypassed or eliminated. In such cases, the signal 315 generated by the second module 332 may be used to implement the carrier recovery (e.g., via a rotation operation 326, described in more detail below).

While the phase estimates are being calculated using the modular carrier recovery process described above, a buffering operation 324 may be applied to the signal 303, thereby resulting in a signal 325 which comprises a delayed version of the signal 303. The delay applied by the buffering operation 324 may be adjusted depending on whether the third module 333 is bypassed. For example, in the event that the third module 333 is bypassed, the buffering operation 324 may apply a delay D1 to the signal 303, where the delay D1 accounts for the time required for the second module 332 to output the signal 315. In the event that the third module 333 is not bypassed, the buffering operation 324 may apply a delay D2 to the signal 303, where the delay D2 accounts for the time required by the third module 333 to output the signal 323, and where D2>D1.

The rotation operation 326 may apply rotations to the delayed signal 325 thereby resulting in a signal 327. The rotations applied by the rotation operation 326 may be based on the signal 315, either directly or indirectly. In the event that the third module is bypassed, the rotations may be based on the signal 315 representing the second phase estimates. In the event that the third module is not bypassed, the rotations may be based on the signal 323 representing the third phase estimates which, as described above, is itself based on the signal 315. The decoding 290 may be applied to the signal 327, thereby resulting in the signal 292. According to some examples, the decoding 290 may involve calculating log likelihood ratios (LLR). The signal 292 may subsequently undergo the FEC decoding 294, as described with respect to FIG. 2.

According to some examples, the delay applied by the buffering operation 324 may be chosen such that the rotation operation 326 is anti-causal. That is, the current signal 325 undergoing the rotation operation 326 may be rotated based on phase estimates associated with a future signal 325.

As will be described in more detail with respect to specific examples, the proposed modular process may be advantageous for implementing carrier recovery, particularly when processing power and line SNR are considerations.

For the purposes of the following examples, each clock cycle has 128 baud (symbols) such that the symbols in the first two clock cycles may be denoted by indices n=0 . . . 255. Every $32^{nd}$ symbol is a pilot symbol, such that the pilot symbols in the first two clock cycles are located at the respective positions n={0, 32, 64, 96, 128, 160, 192, 224}. Each pair of adjacent pilot symbols are separated by 31 data symbols. The eight pilot symbols in the first two clock cycles may be denoted by respective indices m={0, 1, 2, 3, 4, 5, 6, 7}. This configuration of data symbols and pilot symbols is merely one example.

Figure 4:
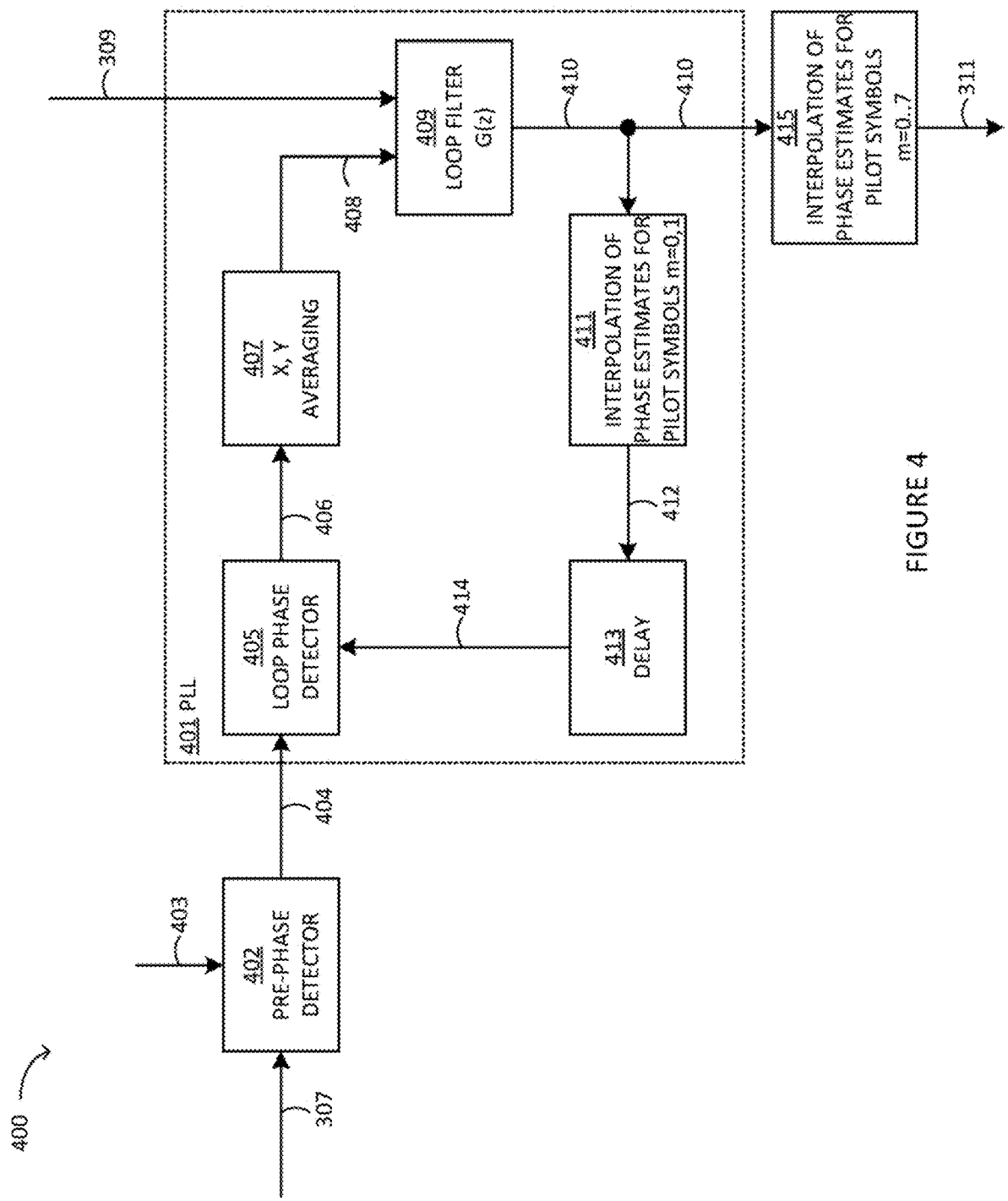
FIG. 4 illustrates a schematic showing phase lock loop processing for pilot symbols in accordance with some examples of the technology disclosed herein.

FIG. 4 illustrates a schematic of example PLL processing 400 applied to pilot symbols as part of a first module of the modular carrier recovery process described herein. The PLL processing 400 is an example of the PLL processing 310.

The PLL processing 400 comprises a PLL 401. In this example, the PLL 401 updates every two clock cycles. In order to ensure that the PLL 401 is able to track the phase of the pilot symbols without becoming unstable, the PLL processing 400 may be designed to minimize the delay incurred by the PLL 401. As will be described below, this may be achieved by performing certain calculations outside of the PLL 401, and also by simplifying those calculations that are performed inside the PLL 401. However, the loop delay incurred by the PLL 401 may also be balanced against the accuracy of the phase estimates generated by the PLL processing 400. For example, by limiting the number of pilot symbols processed within the loop, it is possible to maintain a short loop delay. However, processing fewer pilot symbols within the loop is also expected to reduce the accuracy of the phase estimates. In the current example, a balance between accuracy and loop delay is achieved by processing two out of every eight pilot symbols inside the PLL 401. That is, the PLL processing 400 is configured such that only the first two pilot symbols (m={0, 1}) in a single update (i.e., two clock cycles) are processed within the PLL 401, while seven of the eight phase estimates generated in the update are calculated using an interpolation operation performed outside of the PLL 401.

As described previously, the signal 307 represents the detected phases of a subset of the pilot symbols in the X and Y polarizations. The signal 307 may be denoted by rx(t,m) in the X polarization and ry(t,m) in the Y polarization, where t denotes the update index for the PLL 401. In this example, t is in units of two clock cycles because the loop updates every two clock cycles, and m={0, 1} because the PLL 401 only processes the first two pilot symbols in a single update.

The detected phases rx(t,m) and ry(t,m) of the pilot symbols may include contributions from (i) CFO between the transmitter laser and the receiver laser, (ii) laser phase noise, and (iii) the actual phases of the pilot symbols. The PLL processing 400 may be configured to track the contributions from (i) and (ii) after removing the contribution from (iii).

The actual phases of the first two pilot symbols, also referred to as reference phases, may be denoted by sx(t,m) in the X polarization and sy(t,m) in the Y polarization. In this example, the reference phases sx(t,m) and sy(t,m) for m={0, 1} may be stored in firmware at the receiver. The respective contributions of the reference phases sx(t,m) and sy(t,m) to the detected phases rx(t,m) and ry(t,m) may be removed using a pre-phase detector 402. To reduce latency, the pre-phase detector 402 may be applied outside of the PLL 401, but this is not required.

The pre-phase detector 402 may generate a signal 404 which represents the phase difference modulo [−π,π) between the signal 307 (representing the detected phases rx(t,m), ry(t,m)) and a signal 403 (representing the reference phases sy(t,m), sx(t,m)) for m={0, 1}. The signal 404 may be denoted by dx(t,m) in the X polarization and dy(t,m) in the Y polarization, where:

$$dx(t,m)=(rx(t,m)-sx(t,m))\mathrm{mod}([-\pi,\pi))$$

$$dy(t,m)=(ry(t,m)-sy(t,m))\mathrm{mod}([-\pi,\pi)) \quad [1]$$

for m={0, 1}.

A loop phase detector 405 may be applied to the signal 404 to generate a signal 406 which is a function of the difference modulo [−π,π) between the signal 404 (representing the phases dx(t,m), dy(t,m)) and the signal 414, where the signal 414 represents PLL-generated phase estimates denoted by p1(t−1,m), for m={0, 1}. The signal 406 may be denoted by ex1(t,m) in the X polarization and ey1(t,m) in the Y polarization, where:

$$ex1(t,m)=(dx(t,m)-p1(t-1,m))\mathrm{mod}([-\pi,\pi))$$

$$ey1(t,m)=(dy(t,m)-p1(t-1,m))\mathrm{mod}([-\pi,\pi)) \quad [2]$$

for m={0, 1}.

An averaging operation 407 may be applied to the signal 406 to generate a signal 408 representing an average of the signal 406 across the X and Y polarizations and across the first two pilot symbols. The signal 408, may be denoted by e1(t), where:

$$e1(t)=(\Sigma_{m=0 \ldots 1}ex1(t,m)+\Sigma_{m=0 \ldots 1}ey1(t,m))/4 \quad [3]$$

A loop filter 409 may be applied to the signal 408, thereby generating a signal 410 which represents a phase estimate. According to some examples, the loop filter 409, denoted by $G(z^{-1})$ in the z domain, may comprise a standard second-order digital loop filter. For example, the loop filter 409 may comprise a proportional integral (PI) controller followed by an integrator, which may be expressed as:

$$G(z^{-1}) = \left(2^{-PR} + \frac{2^{-IN}(1+z^{-1})}{1-z^{-1}}\right)\frac{1}{1-z^{-1}} \quad [4]$$

where $2^{-PR}$ denotes a proportional gain coefficient, and where $2^{-IN}$ denotes an integral gain coefficient. By selecting the control coefficients $2^{-PR}$ and $2^{-IN}$ to be powers of two, the loop filter 409 may be applied using simple divide-by-two operations, thereby reducing the loop delay.

The signal 410, which may be denoted by pLIN(t), represents a single phase estimate in linear space which has been calculated based on the phases dx(t,m), dy(t,m) of the first two pilot symbols processed in the $t^{th}$ update of the PLL 401, as well as the phase estimates p1(t−1,m) for the first two pilot symbols as generated in the $(t-1)^{th}$ update. Because the phase estimate pLIN(t) is in linear space (i.e., not limited to −π . . . +π), pLIN(t) tracks CFO in addition to laser phase noise.

Within the PLL 401 an interpolation operation 411 may be applied to the signal 410 to generate a signal 412 which represents the phase estimates modulo [−π,π) for the first two pilot symbols processing during the current update of the PLL 401. The interpolation operation 411 may be implemented using various techniques, including linear interpolation.

Figure 5:
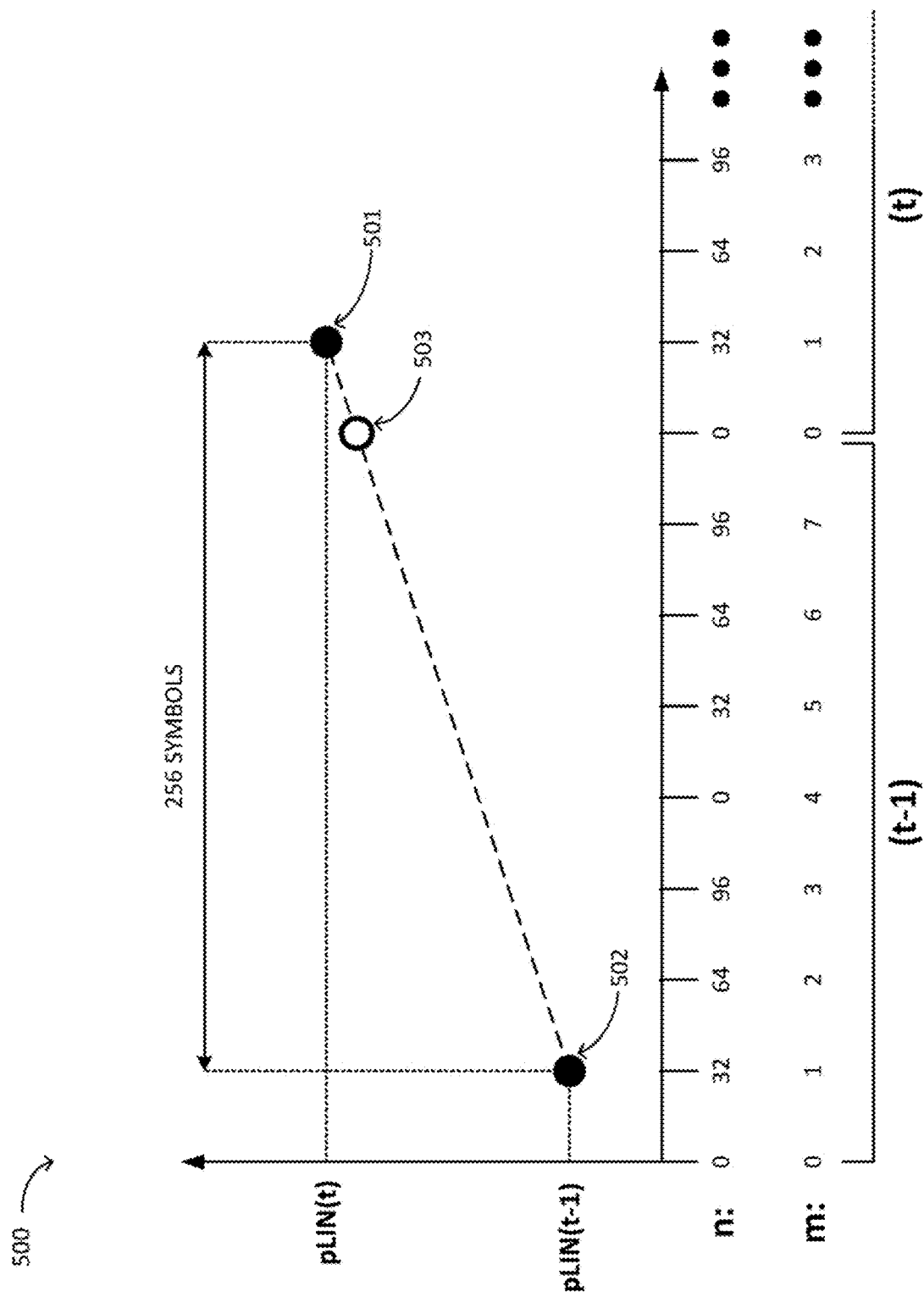
FIG. 5 illustrates a schematic showing linear interpolation in accordance with some examples of the technology disclosed herein.

FIG. 5 illustrates a schematic 500 representing a linear interpolation based on the linear-domain phase estimates pLIN(t) and pLIN(t−1), denoted by points 501 and 502, respectively. The phase estimates p1(t,0) and p1(t,1) may calculated according to:

$$p1(t,1)=pLIN(t)\mathrm{mod}([-\pi,\pi))$$

$$p1(t,0)=\{pLIN(t)-2^{-3}(pLIN(t)-pLIN(t-1))\}\mathrm{mod}([-\pi,\pi)),\quad [5]$$

where p1(t,0) is denoted by point 503. According to some examples, the number of interpolations performed inside the PLL 401 may be minimized in order to maintain a short loop delay. The interpolation operation 411 performed in the current example interpolates only one other pilot symbol (i.e., the first pilot symbol at m=0) within a single update (i.e., two clock cycles).

A delay operation 413 may be applied to the signal 412 representing the phase estimates p1(t,0) and p1(t,1), thereby resulting in the signal 414 representing in the PLL-generated phase estimates p1(t−1,0) and p1(t−1,1), respectively. At the $t^{th}$ update of the PLL 401, loop phase detector 405 compares the PLL-generated phase estimates p1(t−1,m), for m={0,1} (represented by the signal 414) to the phases dx(t,m) and dy(t,m), for m={0, 1} (represented by the signal 404), as expressed in Equation 2.

For each update of the PLL 401, an interpolation operation 415 is applied outside of the PLL 401 to the signal 410 to generate the signal 311 which represents phase estimates modulo [−π,π) for all eight pilot symbols associated with the update. Similarly to the interpolation operation 411, the interpolation operation 415 may involve a simple linear interpolation in linear phase space between the two outputs pLIN(t) and pLIN(t−1) of the loop filter 409.

The PLL processing 400 may be implemented using a very low power circuit since it operates only on pilot symbols (and, moreover, only on a subset of the pilot symbols), and also since the processing does not include any multiplication operations. Each phase estimate p1(t,m), for m=0 . . . 7, that is generated by the PLL processing 400 includes contributions from the CFO and the phase noise.

Figure 6:
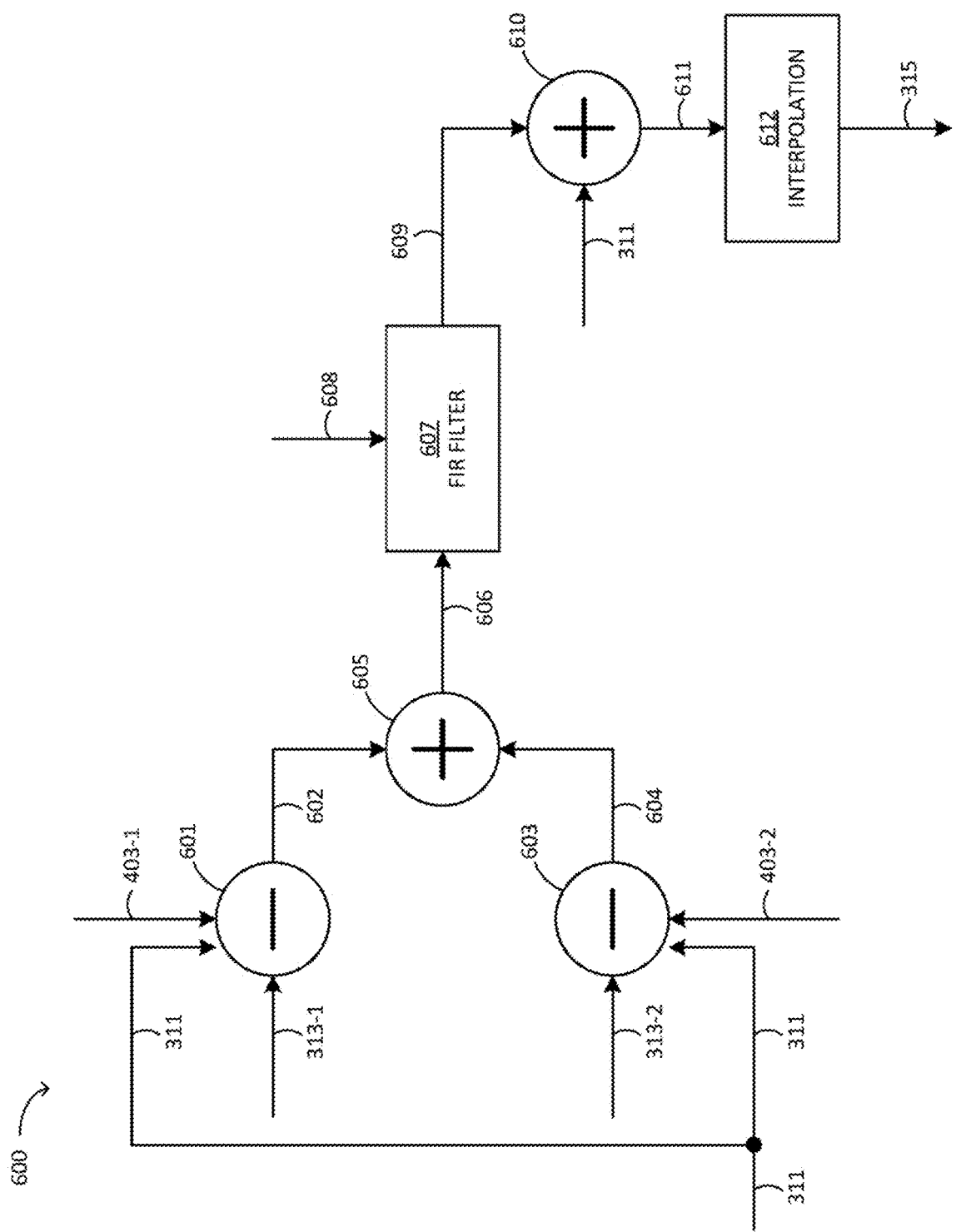
FIG. 6 illustrates a schematic showing feed forward processing for pilot symbols in accordance with some examples of the technology disclosed herein.

FIG. 6 illustrates a schematic of example FF processing 600 applied to pilot symbols as part of a second module of the modular carrier recovery process described herein. The FF processing 600 is an example of the FF processing 314.

Similarly to the PLL processing 400, the FF processing 600 only operates on pilot symbols so it may be implemented using a very low power circuit.

Signals 313-1 and 313-2 represent the detected phases of the eight pilot symbols associated with a single update of the PLL 401 in Module 1 (i.e., two clock cycles). For example, the signal 313-1 may represent the detected phases in the X polarization, denoted by rx(t,m) for m=0 . . . 7, while the signal 313-2 may represent the detected phases in the Y polarization, denoted by ry(t,m) for m=0 . . . 7. The detected phases represented by the signals 313-1 and 313-2 may be generated by applying the Cartesian-to-phase conversion operation 312 to the signal 305, as described with respect to FIG. 3. The combination of the signals 313-1 and 313-2 represents an example of the signal 313 described with respect to FIG. 3.

Signals 403-1 and 403-2 represent the reference phases of the eight pilot symbols associated with the single update of the PLL 401. Where the signals 313-1 and 313-2 represent the detected phases rx(t,m) and ry(t,m), respectively, for m=0 . . . 7, the signals 403-1 and 403-2 represent the reference phases sx(t,m) and sy(t,m), respectively, for m=0 . . . 7.

A difference operation 601 may be applied to the signals 311, 313-1, and 403-1, thereby generating a signal 602 which may be expressed as:

$$ex2(t,m)=(rx(t,m)-p1(t,m)-sx(t,m))\mathrm{mod}([-\pi,\pi))\quad [6]$$

for m=0 . . . 7.

In parallel, another difference operation 603 may be applied to the signals 311, 313-2, and 403-2, thereby generating a signal 604 which may be expressed as:

$$ey2(t,m)=(ry(t,m)-p1(t,m)-sx(t,m))\mathrm{mod}([-\pi,\pi))\quad [7]$$

for m=0 . . . 7.

The signals 602 and 604 represent phase errors for the eight pilot symbols associated with the $t^{th}$ update of the PLL 401 in the X and Y polarizations, respectively.

A summation operation 605 may be applied to the signals 602 and 604 to generate a signal 606 which may be expressed as:

$$e2(t,m)=ex2(t,m)+ey2(t,m)\quad [8]$$

for m=0 . . . 7, where e2(t,m) denotes a combined phase error for $m^{th}$ pilot symbol in the $t^{th}$ update.

A FIR filter 607 may be applied to the signal 606 based on Np filter coefficients 608 stored in firmware, where Np=2L+1, where L is a positive integer, thereby resulting in a signal 609 which may be expressed as:

$$p2\mathrm{init}(t,m)=\Sigma_{i=-L}^{L}W(t,i)e2(t,m-i)\quad [9]$$

where p2init(t,m) denotes an initial phase estimate for the $m^{th}$ pilot symbol in the $t^{th}$ update of the PLL 401, and where W(t,i) denotes the $i^{th}$ filter coefficient of the $t^{th}$ update of the PLL 401. In this example, the initial phase estimate p2init (t,m) is calculated based on L past phase errors (e2(t,m−i), for i=1 . . . L), the current phase error (e2(t,m−i), for i=0), and L future phase errors (e2(t,m−i), for i=−L . . . −1), such that the filter 607 is anti-causal. It is expected that an anti-causal filter may result in initial phase estimates p2init (t,m) that are more precise than those generated by a strictly causal filter, for example, a 3 dB improvement in SNR. According to some examples, the filter coefficients 608 may be updated for each pilot symbol position (i.e., every $32^{nd}$ symbol, in the current example). According to some examples, where the pilot symbols have different energies, the filter coefficients W(t,i), for i=−L . . . L, chosen for the $m^{th}$ pilot symbol may be proportional to the square root of the energy of that pilot symbol. This may enable minimization of the minimum mean square error (MMSE) of the initial phase estimate p2init(t,m).

A summation operation 610 may be applied to the signals 609 and the signal 311, thereby resulting in a signal 611, denoted by p2(t,m), which may be expressed as:

$$p2(t,m)=p2\mathrm{init}(t,m)+p1(t,m)\quad [10]$$

for m=0 . . . 7. The operation 610 reintroduces the phase estimates p1(t,m), which were previously removed by the operations 601 and 603.

An interpolation operation 612 may be applied to the signal 611, thereby resulting in the signal 315. The interpolation operation 612 may interpolate phase estimates for symbol positions between adjacent pilot symbols. According to some examples, the interpolation operation 612 may comprise a simple linear interpolation, such as the one described with respect to FIG. 5. The number of interpolated phase estimates may differ depending on whether or not the third module 333 is bypassed. For example, in the event that the third module 333 is bypassed, the interpolation operation 612 may interpolate phase estimates for all of the 31 symbol positions between adjacent pilot symbols, such that the signal 315 represents 128 phase estimates in a single clock cycle. These phase estimates may then be used by the rotation operation 326 to rotate each of the 128 symbols represented by the signal 325 during the clock cycle. In the event that the third module 333 is not bypassed, the interpolation operation 612 may interpolate phase estimates for a subset of the 31 symbol positions between adjacent pilot symbols, where the subset is determined by the decimation factor N used in the decimation operation 316. In general, the phase estimates represented by the signal 315 during a single clock cycle may be denoted by p2interp(n), where n=0 . . . 127 or where n⊆0 . . . 127. In one example, where the third module 333 is not bypassed, and the decimation operation 316 has a decimation factor of N=4, the interpolated phase estimates between the first pilot symbol (m=0) and the second pilot symbol (m=1) may be calculated as:

$$p2\text{interp}(n)=p2(t,0)+n\cdot(p2(t,1)-p2(t,0))/32 \quad [11]$$

for n={4, 8, 12, 16, 20, 24, 28}.

The interpolation operation 612 may be done in the linear space since the phase estimates p2(t,m), for m=0 . . . 7 include the CFO contribution.

Figure 7:
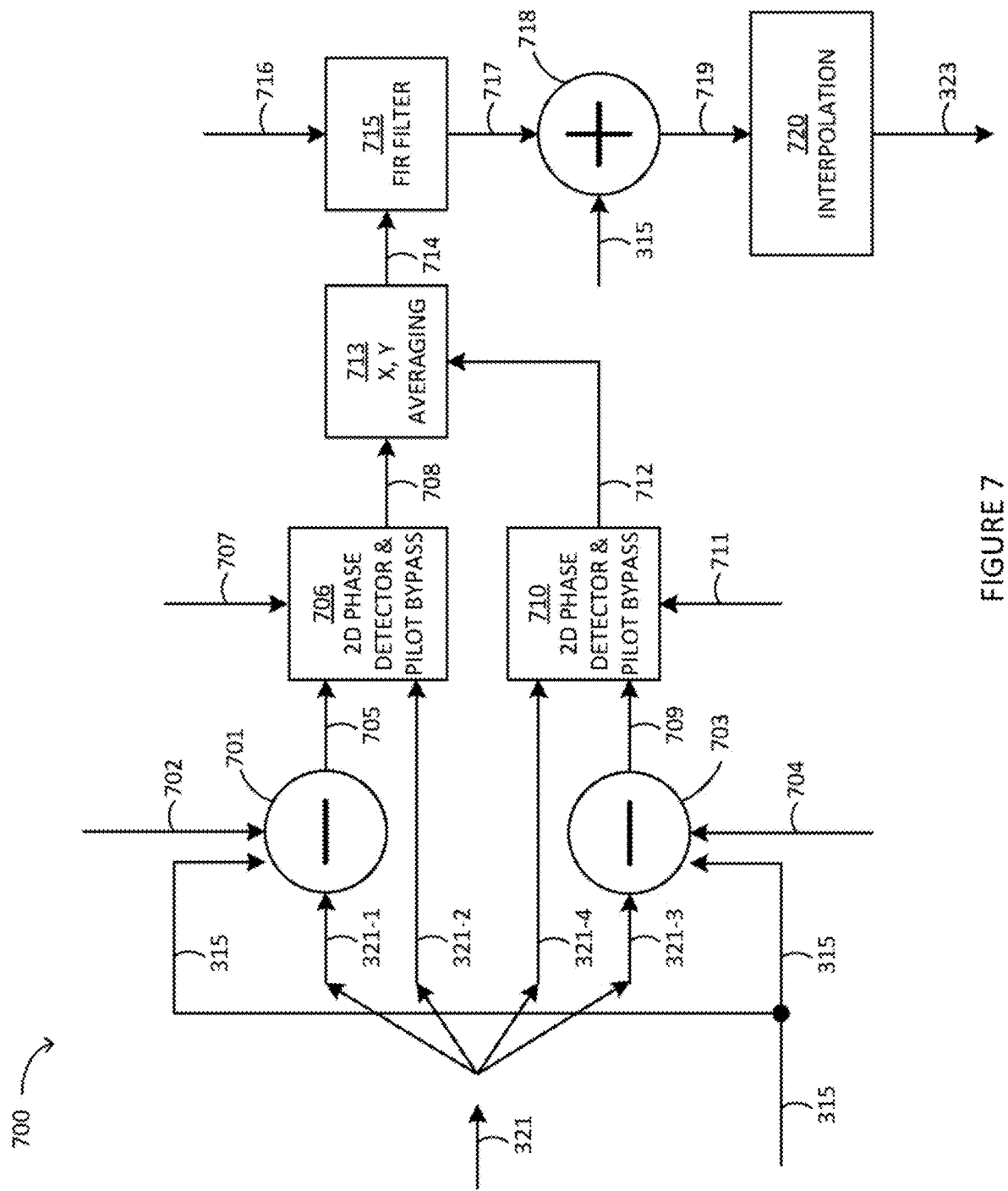
FIG. 7 illustrates a schematic showing feed forward processing for data symbols and pilot symbols in accordance with some examples of the technology disclosed herein.

FIG. 7 illustrates a schematic of example FF processing 700 applied to pilot symbols and data symbols as part of an optional third module of the modular carrier recovery process described herein. The FF processing 700 is an example of the FF processing 322.

This example will consider the symbols processed during a single clock cycle, indexed by n=0 . . . 127. As described with respect to FIG. 3, the signal 321 input to the FF processing 322 represents a decimated, delayed version of the signal 303, which has been converted to polar coordinates. In FIG. 7, signals 321-1 and 321-2 represent a radius XR and a phase XP, respectively, in the X polarization, while signals 321-3 and 321-4 represent a radius YR and a phase YP, respectively, in the Y polarization. In the event that the decimation operation 316 uses a decimation factor N=4, each of the signals 321-1, 321-2, 321-3, 321-4 may represent 32 symbols during a single clock cycle. These symbols correspond to the indices n={0, 4, 8, 12, . . . , 124}. It will be apparent that the decimation operation 316 maintains all four pilot symbols, which are located at positions n={0, 32, 64, 96}, and maintains only a subset of the data symbols (specifically, only 28 of the 124 data symbols processed during the clock cycle). Each of the phases XP(n), YP(n) represented by the signals 321-1, 321-3, respectively, may comprise a modulo [−π,π) value represented by np signed bits, where np is a positive integer, while each of the radii XR(n), YR(n) represented by the signals 321-2, 321-4, respectively, may comprise an unsigned value represented by nr bits, where nr is a positive integer. There is radius and phase information for the 28 data symbols, and only phase information for the four pilot symbols. That is, for the pilot symbols in the signal 319, a Cartesian-to-phase conversion operation may be applied instead of the Cartesian-to-polar conversion operation 320.

Signals 702 and 704 represent the reference phases of the pilot symbols in the X and Y polarizations, respectively, in addition to an optional data programmable phase offset which may be used to optimize the performance of phase detectors 706 and 710, described in more detail below. For example, in the case of a pilot symbol (i.e., selected from n={0, 32, 64, 96}), the signal 702 (or 704) represents the corresponding reference phase sx(n) (or sy(n)) for that pilot symbol, whereas, in the case of a data symbol (i.e., selected from n={0, 4, 8, 12, . . . , 124}-{0, 32, 64, 96}), the signal 702 (or 704) represents a data programmable offset, herein denoted by DPO. According to some examples, DPO=0.

A difference operation 701 may be applied to the signals 315, 321-1, and 702, thereby generating a signal 705. The signal 705 represents, in part, rotated phases in the X polarization of the 28 data symbols in the clock cycle, which may be expressed as:

$$XD(n)=(XP(n)-p2\text{interp}(n)-DPO)\text{mod}[-\pi,\pi), \quad [12]$$

for n={0, 4, 8, 12, . . . , 124}-{0, 32, 64, 96}. The signal 705 also represents phase errors in the X polarization for the four pilot symbols in the clock cycle, which may be expressed as $$XPE(n)=(XP(n)-p2\text{interp}(n)-sx(n))\text{mod}[-\pi,\pi), \quad [13]$$

for n={0, 32, 64, 96}.

In parallel, another difference operation 703 may be applied to the signals 315, 321-3, and 704, thereby generating a signal 709. The signal 709 represents, in part, rotated phases in the Y polarization of the 28 data symbols in the clock cycle, which may be expressed as:

$$YD(n)=(YP(n)-p2\text{interp}(n)-DPO)\text{mod}[-\pi,\pi), \quad [14]$$

for n={0, 4, 8, 12, . . . , 124}-{0, 32, 64, 96}. The signal 709 also represents phase errors in the Y polarization for the four pilot symbols in the clock cycle, which may be expressed as $$YPE(n)=(YP(n)-p2\text{interp}(n)-sy(n))\text{mod}[-\pi,\pi), \quad [15]$$

for n={0, 32, 64, 96}.

The effect of the difference operations 701, 703 is to rotate the phase of both the pilot symbols and the decimated data symbols by the phase estimate p2interp(n) generated by the second module 332 of the carrier recovery process, where p2interp(n) includes the estimated CFO.

A two-dimensional phase detector 706 may be applied to the signals 705 and 321-2, thereby resulting in a signal 708. In parallel, another two-dimensional phase detector 710 may be applied to the signals 709 and 321-4, thereby resulting in a signal 712.

The phase detector 706 is configured to use a programmable look-up table (LUT) 707 to generate phase estimates based on the signals 705 and 321-2. Specifically, the rotated phases XD(n) (represented by the signal 705) and the corresponding radii XR(n) (represented by the signal 321-2) of the 28 data symbols are used together with the LUT 707 to generate phase errors for the data symbols (n={0, 4, 8, 12, . . . , 124}-{0, 32, 64, 96}). The LUT 707 may comprise an N-bit address to accommodate both radius bits and phase bits, where N is a positive integer satisfying N=nr×np. For a quadrant-symmetric constellation, the input phases XD(n) may be folded into −π/4 to π/4. The portion of the signal 705 representing the pilot symbols (i.e., XPE(n) for n={0, 32, 64, 96}) may bypass (or remain unmodified by) the phase detector 706. Ultimately, the signal 708 output by the phase detector 706 during a single clock cycle may represent 32 phase errors, denoted by ex3(n), for n={0, 4, 8, 12, . . . , 124}, which include 28 phase errors determined from data symbols and four phase errors determined from pilot symbols.

The phase detector 710 is configured to use a programmable LUT 711 to generate phase estimates based on the signals 709 and 321-4. Specifically, the rotated phases YD(n) (represented by the signal 709) and the corresponding radii YR(n) (represented by the signal 321-4) of the 28 data symbols are used together with the LUT 711 to generate phase errors for the data symbols (n={0, 4, 8, 12, ..., 124}-{0, 32, 64, 96}). The LUT 711 may comprise an N-bit address to accommodate both radius bits and phase bits, where N is a positive integer satisfying N=nr×np. For a quadrant-symmetric constellation, the input phases yD(n) may be folded into −π/4 to π/4. The portion of the signal 709 representing the pilot symbols (i.e., YPE(n) for n={0, 32, 64, 96}) may bypass (or remain unmodified by) the phase detector 710. Ultimately, the signal 712 output by the phase detector 710 during a single clock cycle may represent 32 phase errors, denoted by ey3(n), for n={0, 4, 8, 12, ..., 124}, which include 28 phase errors determined from data symbols and four phase errors determined from pilot symbols.

Because the phase detectors 706, 710 use phase references given by pilot-driven functions, they cannot suffer from cycle slips.

An averaging operation 713 may be applied to the signals 708 and 712 during each clock cycle, thereby resulting in a signal 714. The signal 714 represents an average phase error associated with each pilot symbol in a single clock cycle, denoted by e3(m), for m={0, 1, 2, 3}, where the average is based on the X and Y phase errors of the current pilot symbol, the X and Y phase errors of the four data symbols preceding the current pilot symbol, and the X and Y phase errors of the three data symbols following the current pilot symbol. For example, in the case of the pilot symbol at n=32 (which corresponds to m=1), the average error e3(1) may be calculated as:

$$e3(1)=[ex3(16)+ey3(16)+ex3(20)+ey3(20)+ex3(24)+ ey3(24)+ex3(28)+ey3(28)+ex3(32)+ey3(32)+ex3 (36)+ey3(36)+ex3(40)+ey3(40)+ex3(44)+ey3 (44)]/16 \quad [16]$$

where ex3(32) and ey3(32) represent the phase errors in the X and Y polarizations, respectively, for the current pilot symbol, where ex3(n) and ey3(n), for n={16, 20, 24, 28}, represent the phase errors in the X and Y polarizations, respectively, for the four data symbols preceding the current pilot symbol at n=32, and where ex3(n) and ey3(n), for n={36, 40, 44}, represent the phase errors in the X and Y polarizations, respectively, for the three data symbols following the current pilot symbol at n=32.

A FIR filter 715 may be applied to the signal 714 based on Nd filter coefficients 716 stored in firmware, where Nd=2K+1, where K is a positive integer, thereby resulting in a signal 717, which may be expressed as:

$$p3\text{init}(m)=\Sigma_{i=-K}^{K}(Z(i)e3(m-i)) \quad [17]$$

where p3init(m) denotes an initial phase estimate for the $m^{th}$ symbol in the current clock cycle, for m={0, 1, 2, 3}, and where Z(i) denotes the $i^{th}$ filter coefficient. In this example, the initial phase estimate p3init(m) is calculated based on K past phase errors (e3(m−i), for i=1 ... K), the current phase error (e3(m−i), for i=0), and K future phase errors (e3(m−i), for i=−K ... −1), such that the filter is anti-causal. It is expected that an anti-causal filter may result in initial phase estimates p3init(m) that are more precise than those generated by a strictly causal filter. The filtered signals 717 may represent four phase estimates of the four pilots in one clock cycle.

A summation operation 718 may be applied to the signals 717 and 315, thereby resulting in a signal 719, denoted by p3(m), which may be expressed as:

$$p3(m)=p3\text{init}(m)+p2(m) \quad [18]$$

for m={0, 1, 2, 3}. The operation 718 reintroduces the phase estimates p2(m), which were previously removed by the operations 701 and 703.

An interpolation operation 720 may be applied to the signal 719, thereby resulting in the signal 323, where the interpolation operation 720 interpolates a phase estimate for each data symbol between the adjacent pilot symbols. The interpolation operation 720 may comprise a simple linear interpolation. In the case of the data symbols located between the first two pilot symbols at m={0, 1} (or n={0, 32}), the phase estimates may be interpolated as follows:

$$p3\text{interp}(n)=p3(0)+n\cdot(p3(1)-p3(0))/32 \quad [19]$$

for n=1 ... 31.

The interpolation operation 720 may be done in the linear space since the phase estimates p3(m), for m={0, 1, 2, 3} include the CFO contribution.

According to some examples, where the third module 333 is not bypassed, the third phase estimates represented by the signal 323 may be used by the rotation operation 326 to apply rotations to the signal 325, thereby achieving carrier recovery.

Figure 8:
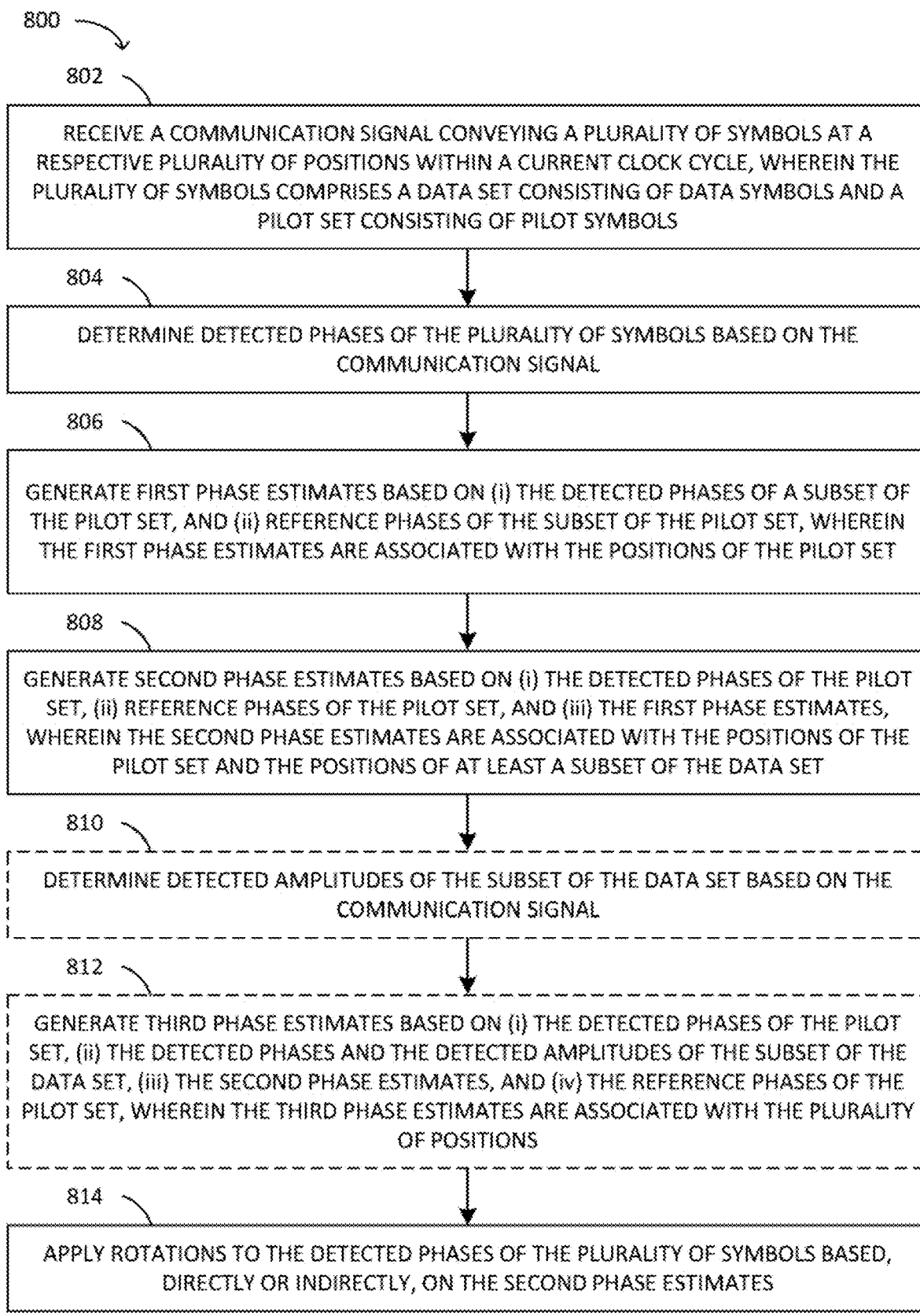
FIG. 8 illustrates a method for modular carrier recovery in accordance with some examples of the technology disclosed herein.

FIG. 8 illustrates an example method 800 for modular carrier recovery. The method 800 may be implemented by a receiver device, such as the receiver device 104 or 200. In general, the method 800 may be implemented using circuitry configured to perform the various steps of the method 800. The circuitry may comprise various combinations of hardware, firmware and software, such as processors (including DSPs), computer-readable media storing computer-executable instructions or code, ASICs, and the like.

At 802, the receiver device receives a communication signal conveying a plurality of symbols at a respective plurality of positions within a current clock cycle, wherein the plurality of symbols comprises a data set consisting of data symbols and a pilot set consisting of pilot symbols. Examples of the communication signal include the signals 204, 301, and 303. As described previously, the pilot symbols may be distributed amongst the data symbols such that each clock cycle comprises the same number of pilot symbols occupying the same positions within the clock cycle.

At 804, the receiver device determines detected phases of the plurality of symbols based on the communication signal. According to some examples, the detected phases may include phases in more than one dimension, such as the X polarization and the Y polarization.

At 806, the receiver device generates first phase estimates based on (i) the detected phases of a subset of the pilot set, and (ii) reference phases of the subset of the pilot set, wherein the first phase estimates are associated with the positions of the pilot set. For example, as described with respect to the first module 331, the signal 311 representing the first phase estimates is generated based on (i) the signal 307 representing the detected phases of the first and second pilot symbols, and (ii) the signal 403 representing the reference phases of the first and second pilot symbols. According to some examples, first phase error estimates are generated within a PLL based on differences between (i) the detected phases of the subset of the pilot set, and (ii) reference phases of the subset of the pilot set. For example, based on signal 404 generated by the pre-phase detector 402 (which implements the calculation in Equation 1 using the signals 307 and 403), the signal 408 representing the first phase error estimates is generated within the PLL 401. According to some examples, linear phase estimates are generated by applying a loop filter of the PLL to the first phase error estimates, and the first phase estimates are generated by interpolating between (i) the linear phase estimates in the current clock cycle and (ii) the linear phase estimates in a previous clock cycle. For example, the signal 410 (which represents the phase estimate for a single pilot symbol in the linear domain) is generated by applying the loop filter 409 of the PLL 401 to the signal 408 representing the first phase error estimates. The signal 311 (which represents the first phase estimates) is generated by applying the interpolation operation 415 to the signal 410.

At 808, the receiver device generates second phase estimates based on (i) the detected phases of the pilot set, (ii) reference phases of the pilot set, and (iii) the first phase estimates, wherein the second phase estimates are associated with the positions of the pilot set and the positions of at least a subset of the data set. For example, as described with respect to the second module 332, the signal 315 representing the second phase estimates is generated based on (i) the signal 313 representing the detected phases of all the pilot symbols, and (ii) the signals 403-1, 403-2 representing the reference phases of all the pilot symbols. According to some examples, second phase error estimates are generated based on differences between (i) the detected phases of the pilot set, and (ii) a sum of the first phase estimates and the reference phases of the pilot set. For example, based on signals 602, 604 generated by the respective difference operations 601, 603 (which implement the calculations in Equations 6 and 7 using the signals 311, 313-1, 403-1 and the signals 311, 313-2, 403-2, respectively), the signal 606 representing the second phase error estimates is generated. According to some examples, linear phase estimates are generated from a sum of (i) a signal generated by applying a FIR filter to the second phase error estimates, and (ii) the first phase estimates; and the second phase estimates are generated by interpolating between adjacent linear phase estimates. For example, the signal 611 (which represents the phase estimates for all the pilot symbols in the linear domain) is generated by applying the FIR filter 607 to the signal 606, followed by the addition of the signal 311 using the operation 610. The signal 315 (which represents the second phase estimates) is generated by applying the interpolation operation 612 to the signal 611. According to some examples, the FIR filter used to generate the second phase estimates is anti-causal. According to some examples, in the event that the third module 333 is bypassed, the second phase estimates are associated with the plurality of positions (i.e., the positions of the pilot set and the positions of the data set).

Optionally, at 810, the receiver device determines detected amplitudes of the subset of the data set based on the communication signal. For example, as described with respect to the third module 333, the detected amplitudes represented by the signals 321-2, 321-4 may be determined based on the signal 303.

Optionally, at 812, the receiver device generates third phase estimates based on (i) the detected phases of the pilot set, (ii) the detected phases and the detected amplitudes of the subset of the data set, (iii) the second phase estimates, and (iv) the reference phases of the pilot set, wherein the third phase estimates are associated with the plurality of positions. For example, as described with respect to the third module 333, the signal 323 representing the third phase estimates is generated based on the signals 321-1, 321-3 representing the detected phases of all the pilot symbols and the detected phases of the subset of the data symbols; the signals 321-2, 321-4 representing the detected amplitudes of the subset of the data symbols; the signal 315 representing the second phase estimates; and the signals 702, 704 representing, at least in part, the reference phases of all the pilot symbols. According to some examples, third phase error estimates for the pilot set are generated based on differences between (i) the detected phases of the pilot set, and (ii) a sum of the second phase estimates and the reference phases of the pilot set. For example, based on signals 705, 709 generated by the respective difference operations 701, 703 (which implement the calculations in Equation 13 and 15 using the signals 315, 321-1, 702 and the signals 315, 321-3, 704, respectively), the third phase error estimates for the pilot set are generated. According to some examples, the third phase error estimates for the subset of the data set are generated by applying a two-dimensional phase detector to (i) the detected phases of the subset of the data set, rotated by the second phase estimates, and (ii) the detected amplitudes of the subset of the data set. For example, the phase detectors 706, 710 are applied to the signals 705, 709, respectively (which respectively correspond to the signals 321-1, 321-3, which represent the detected phases of the subset of the data set, rotated by the signal 315, as expressed in Equations 12 and 14) and to the signals 321-2, 321-4 (which respectively represent the detected amplitudes of the subset of the data set). Thus, the third phase error estimates, which include the third phase error estimates for the pilot set and for the subset of the data set, may be represented by the signal 714. According to some examples, linear phase estimates are generated from a sum of (i) a signal (717) generated by applying a FIR filter (715) to the third phase error estimates (714), and (ii) the second phase estimates (315). For example, the signal 719 (which represents the phase estimates for all the pilot symbols and a subset of the data symbols in the linear domain) is generated by applying the FIR filter 715 to the signal 714, followed by the addition of the signal 315 using the operation 718. The signal 323 (which represents the third phase estimates) is generated by applying the interpolation operation 720 to the signal 719. According to some examples, the FIR filter used to generate the third phase estimates is anti-causal.

According to some examples, the receiver device may buffer the pilot set and the subset of the data set for a time period based on a processing time incurred by generating the second phase estimates. For example, as described with respect to the third module 333, a buffering operation 318 may be applied using a delay that is based on an amount of time required to generate the signal 315.

At 814, the receiver device applies rotations to the detected phases of the plurality of symbols based, directly or indirectly, on the second phase estimates. That is, in the event that steps 810 and 812 are not performed, the rotations are based on the second phase estimates generated at 808. For example, the rotation operation 326 may be applied to the signal 325 based on the signal 315. In the event that steps 810 and 812 are performed, the rotations are based on the third phase estimates generated at 812, which are indirectly based on the second phase estimates generated at 808. For example, the rotation operation 326 may be applied to the signal 325 based on the signal 323.

According to some examples, the receiver device may buffer the detected phases of the plurality of symbols prior to applying the rotations. For example, a buffering operation 324 may be applied to the signal 303.

Table 1 contains experimental results showing the performance of the modular carrier recovery system described herein. The results were obtained using various modulation formats, line SNR values, and laser types, where PC denotes performance class and OIF denotes Optical Interoperability Forum.

| Modulation format | Line SNR (dB) | Laser phase mask | RMS error of first phase estimates (degrees) | RMS error of second phase estimates (degrees) | RMS error of third phase estimates (degrees) |
|---|---|---|---|---|---|
| 16 QAM with PCS | 8.3 | PC | 6.3 | 3.8 | 3.0 |
| QPSK | 6.3 | PC | 8.5 | 4.5 | 3.1 |
| 16 QAM | 12.7 | PC | 6.2 | 2.5 | 2.0 |
| QPSK | 10 | 400G OIF | 17.2 | 4.5 | 3.0 |

The performance improvement resulting from each module of the carrier recovery process may be indicated by the standard deviation of the phase error (i.e., the difference between the phase estimates output by the module and the true phase of the data. Each successive module achieves an additional improvement in performance. For example, for a given modulation format, line SNR, and laser type, the RMS error of the second phase estimates is lower than the RMS error of the first phase estimates. Similarly, the RMS error of the third phase estimates is lower than the RMS error of the second phase estimates.

Depending on the additional performance enhancement that is achievable from the third module, this module may be bypassed or eliminated so as to save power. The determination of whether it may be of interest to bypass the third module may be based, in part, on the NSR contribution associated with the RMS error of the phase estimates following the second module.

Figure 9:
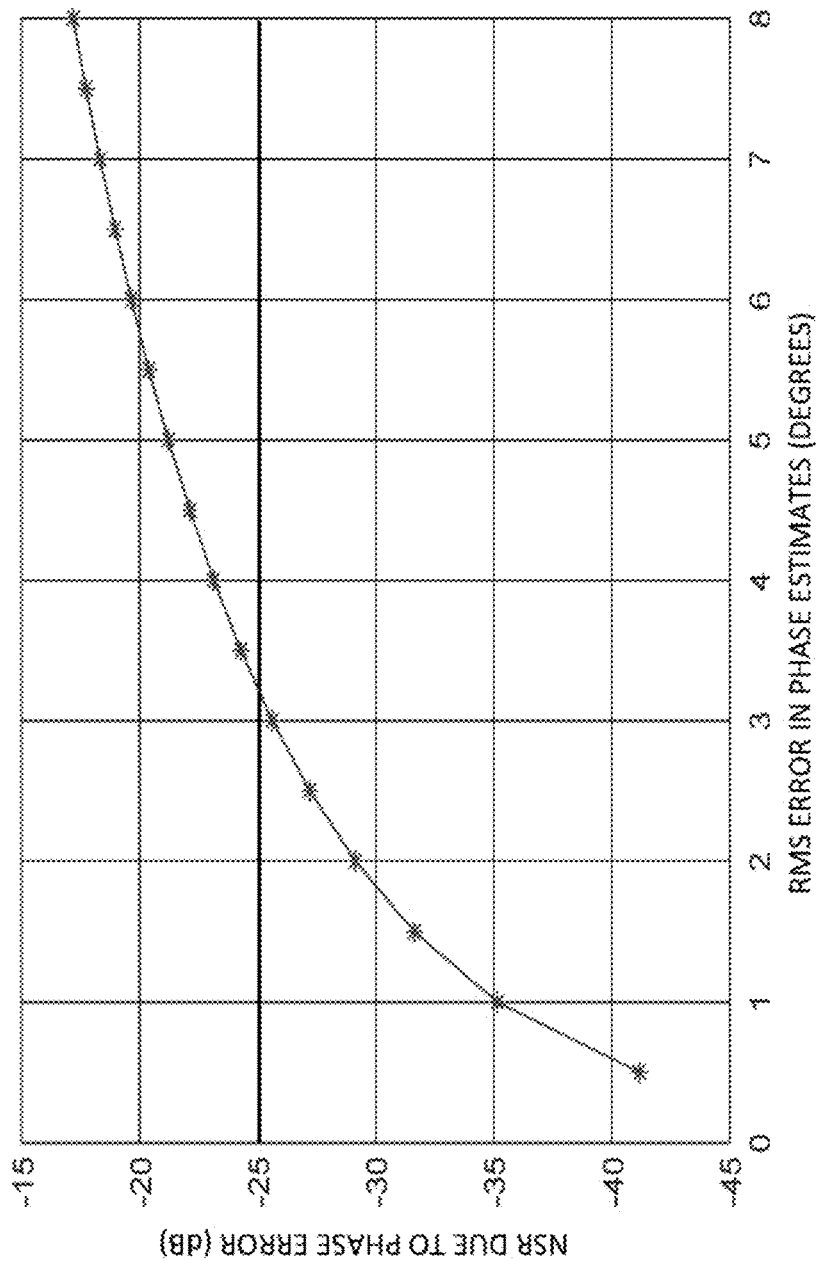
FIG. 9 illustrates a plot showing the relationship between phase error and noise-to-signal ratio (NSR) due to phase error alone.

FIG. 9 illustrates a plot of NSR in dB resulting from phase error alone as a function of the RMS error of the phase estimates in degrees. According to some examples, a value of NSR that does not exceed −25 dB may be deemed acceptable. Referring to the experimental results obtained with 16QAM in Table 1, the second phase estimates generated by the second module have an RMS error of 2.5 degrees, which corresponds to NSR≈−27 dB, whereas the third phase estimates generated by the third module have an RMS error of 2.0 degrees, which corresponds to NSR≈−29 dB. In this case, since the NSR associated with the second phase estimates is already lower than −25 dB, it may be advantageous to bypass the third module. The benefit of reducing power by eliminating the third module may outweigh the marginal NSR improvement that may be achieved by including the third module. On the other hand, referring to the experimental results obtained with 16QAM with PCS in Table 1, the second phase estimates generated by the second module have an RMS error of 3.8 degrees, which corresponds to NSR≈−23 dB, whereas the third phase estimates generated by the third module have an RMS error of 3.0 degrees, which corresponds to NSR≈−26 dB. In this case, because the NSR associated with the second phase estimates exceeds −25 dB, it may be advantageous to include the third module during carrier recovery. The additional power requirements may be warranted in order to achieve NSR<−25 dB.

The scope of the claims should not be limited by the details set forth in the examples, but should be given the broadest interpretation consistent with the description as a whole.

What is claimed is:

1. A receiver apparatus comprising:
a communication interface configured to receive a communication signal conveying a plurality of symbols at a respective plurality of positions within a current clock cycle, wherein the plurality of symbols comprises a data set consisting of data symbols and a pilot set consisting of pilot symbols;
circuitry configured to determine detected phases of the plurality of symbols based on the communication signal;
circuitry configured to generate first phase estimates in linear space based on the detected phases of a subset of the pilot set, and reference phases of the subset of the pilot set, wherein the first phase estimates are associated with the positions of the pilot set, and wherein the first phase estimates track carrier frequency offset and are free of cycle slips;
circuitry configured to generate second phase estimates based on the detected phases of the pilot set, reference phases of the pilot set, and the first phase estimates, wherein the second phase estimates are associated with the positions of the pilot set and the positions of at least a subset of the data set; and
circuitry configured to apply rotations to the detected phases of the plurality of symbols based on the second phase estimates.

2. The receiver apparatus as claimed in claim 1, further comprising
circuitry configured to determine detected amplitudes of the subset of the data set based on the communication signal; and
circuitry configured to generate third phase estimates based on the detected phases of the pilot set, the detected phases and the detected amplitudes of the subset of the data set, the second phase estimates, and the reference phases of the pilot set, wherein the third phase estimates are associated with the plurality of positions.

3. The receiver apparatus as claimed in claim 1, wherein the circuitry configured to generate the first phase estimates comprises
circuitry configured to generate first phase error estimates within a phase lock loop based on differences between the detected phases of the subset of the pilot set, and the reference phases of the subset of the pilot set;
circuitry configured to generate linear phase estimates by applying a loop filter of the phase lock loop to the first phase error estimates; and
circuitry configured to generate the first phase estimates by interpolating between the linear phase estimates in the current clock cycle and the linear phase estimates in a previous clock cycle.

4. The receiver apparatus as claimed in claim 1, wherein the circuitry configured to generate the second phase estimates comprises
circuitry configured to generate second phase error estimates based on differences between the detected phases of the pilot set and a sum of the first phase estimates and the reference phases of the pilot set;
circuitry configured to generate linear phase estimates from a sum of the first phase estimates and a signal generated by applying a finite impulse response (FIR) filter to the second phase error estimates; and
circuitry configured to generate the second phase estimates by interpolating between adjacent linear phase estimates.

5. The receiver apparatus as claimed in claim 4, wherein the FIR filter is anti-causal.

6. The receiver apparatus as claimed in claim 2, wherein the circuitry configured to generate the third phase estimates comprises circuitry configured to generate third phase error estimates comprising third phase error estimates for the pilot set and third phase error estimates for the subset of the data set, wherein the third phase error estimates for the pilot set are generated based on differences between the detected phases of the pilot set, and a sum of the second phase estimates and the reference phases of the pilot set, and wherein the third phase error estimates for the subset of the data set are generated by applying a two-dimensional phase detector to the detected phases of the subset of the data set, rotated by the second phase estimates, and to the detected amplitudes of the subset of the data set;

circuitry configured to generate linear phase estimates from a sum of the second phase estimates and a signal generated by applying a finite impulse response (FIR) filter to the third phase error estimates; and circuitry configured to generate the third phase estimates by interpolating between adjacent linear phase estimates.

7. The receiver apparatus as claimed in claim 6, wherein the FIR filter is anti- causal.

8. The receiver apparatus as claimed in claim 1, further comprising
circuitry configured to buffer the detected phases of the plurality of symbols prior to applying the rotations.

9. The receiver apparatus as claimed in claim 2, further comprising
circuitry configured to buffer the pilot set and the subset of the data set for a time period based on a processing time incurred by the receiver apparatus in generating the second phase estimates.

10. The receiver apparatus as claimed in claim 1, wherein the second phase estimates are associated with the plurality of positions.

11. A method comprising:
receiving at a receiver apparatus a communication signal conveying a plurality of symbols at a respective plurality of positions within a current clock cycle, wherein the plurality of symbols comprises a data set consisting of data symbols and a pilot set consisting of pilot symbols;

determining detected phases of the plurality of symbols based on the communication signal;

generating first phase estimates in linear space based on the detected phases of a subset of the pilot set, and reference phases of the subset of the pilot set, wherein the first phase estimates are associated with the positions of the pilot set, and wherein the first phase estimates track carrier frequency offset and are free of cycle slips;

generating second phase estimates based on the detected phases of the pilot set, reference phases of the pilot set, and the first phase estimates, wherein the second phase estimates are associated with the positions of the pilot set and the positions of at least a subset of the data set; and applying rotations to the detected phases of the plurality of symbols based on the second phase estimates.

12. The method as claimed in claim 11, further comprising
determining detected amplitudes of the subset of the data set based on the communication signal; and generating third phase estimates based on the detected phases of the pilot set, the detected phases and the detected amplitudes of the subset of the data set, the second phase estimates, and the reference phases of the pilot set, wherein the third phase estimates are associated with the plurality of positions.

13. The method as claimed in claim 11, further comprising
generating first phase error estimates within a phase lock loop based on differences between the detected phases of the subset of the pilot set, and the reference phases of the subset of the pilot set;

generating linear phase estimates by applying a loop filter of the phase lock loop to the first phase error estimates; and generating the first phase estimates by interpolating between the linear phase estimates in the current clock cycle and the linear phase estimates in a previous clock cycle.

14. The method as claimed in claim 11, further comprising
generating second phase error estimates based on differences between the detected phases of the pilot set and a sum of the first phase estimates and the reference phases of the pilot set;

generating linear phase estimates from a sum of the first phase estimates and a signal generated by applying a finite impulse response (FIR) filter to the second phase error estimates; and generating the second phase estimates by interpolating between adjacent linear phase estimates.

15. The method as claimed in claim 14, wherein the FIR filter is anti-causal.

16. The method as claimed in claim 12, further comprising
generating third phase error estimates comprising third phase error estimates for the pilot set and third phase error estimates for the subset of the data set, wherein the third phase error estimates for the pilot set are generated based on differences between the detected phases of the pilot set, and a sum of the second phase estimates and the reference phases of the pilot set, and wherein the third phase error estimates for the subset of the data set are generated by applying a two-dimensional phase detector to the detected phases of the subset of the data set, rotated by the second phase estimates, and to the detected amplitudes of the subset of the data set;

generating linear phase estimates from a sum of the second phase estimates and a signal generated by applying a finite impulse response (FIR) filter to the third phase error estimates; and generating the third phase estimates by interpolating between adjacent linear phase estimates.

17. The method as claimed in claim 16, wherein the FIR filter is anti-causal.

18. The method as claimed in claim 11, further comprising
buffering the detected phases of the plurality of symbols prior to applying the rotations.

19. The method as claimed in claim 12, further comprising
buffering the pilot set and the subset of the data set for a time period based on a processing time incurred by the receiver apparatus in generating the second phase estimates.

20. The method as claimed in claim 11, wherein the second phase estimates are associated with the plurality of positions.

* * * * *